(12) United States Patent
Pillsbury, IV (10) Patent No.: US 6,314,833 B1
(45) Date of Patent: Nov. 13, 2001

(54) APPARATUS FOR ATTACHING A VEHICLE STEERING WHEEL TO A VEHICLE STEERING SHAFT

(75) Inventor: Charles S. Pillsbury, IV, Rochester, MI (US)

(73) Assignee: TRW Inc., Lyndhurst, OH (US)

( * ) Notice: Subject to any disclaimer, the term of this patent is extended or adjusted under 35 U.S.C. 154(b) by 0 days.

(21) Appl. No.: 09/584,451

(22) Filed: May 31, 2000

(51) Int. Cl.$^7$ ....................................................... B62D 1/10
(52) U.S. Cl. ........................................... 74/552; 403/374.3
(58) Field of Search ........................... 74/552; 403/374.3, 403/379.4

(56) References Cited

U.S. PATENT DOCUMENTS

| | | | |
|---|---|---|---|
| 5,588,337 | * 12/1996 | Milton | 74/552 |
| 5,615,910 | 4/1997 | Margetak et al. | |
| 5,617,763 | * 4/1997 | Cymbal | 74/552 |
| 5,848,806 | 12/1998 | Hosoi et al. | |
| 5,855,145 | 1/1999 | Hosoi et al. | |
| 5,921,147 | * 7/1999 | Nagata et al. | 74/552 |
| 6,199,448 | * 3/2001 | Ruedisueli et al. | 74/552 |

\* cited by examiner

*Primary Examiner*—Mary Ann Green
(74) *Attorney, Agent, or Firm*—Tarolli, Sundheim, Covell, Tummino & Szabo L.L.P.

(57) ABSTRACT

An apparatus (10) comprises a vehicle steering wheel (12) including a hub portion (54) having a splinded inner surface (62) and diametrically opposed first and second angled surface portions (76 and 78). A vehicle steering shaft (14) is rotatable about a first axis (16) to effect vehicle steering. The steering shaft (14) includes an end portion (18) having an outer surface with splines that mesh with the splined inner surface (62) of the hub portion (54) to connect the steering shaft non-rotatably with the steering wheel. The end portion (18) includes an inner surface (42) defining a passage (40) through the end portion that extends transverse to the first axis (16). A bolt (150) has a head portion (152), a threaded outer surface (156), and a shank portion (164). The shank portion (164) is disposed in the passage (40) through the steering shaft (14) and engages the inner surface (42). The head portion (152) has a first frustoconical surface (162). A nut (130) screws onto the bolt (150). The nut (130) includes a second frustoconical surface (144). The first frustoconical surface (162) on the bolt (150) and the second frustoconical surface (144) on the nut (130) engage the angled surface portions (76 and 78), respectively, on the hub portion (54). These engagements create a compressive reaction load between the hub portion and the steering shaft (14) and block relative axial movement between the steering wheel (12) and the steering shaft.

18 Claims, 8 Drawing Sheets

APPARATUS FOR ATTACHING A VEHICLE STEERING WHEEL TO A VEHICLE STEERING SHAFT

TECHNICAL FIELD

The present invention relates to an apparatus for attaching a vehicle steering wheel to a vehicle steering shaft.

BACKGROUND OF THE INVENTION

A vehicle steering shaft is typically connected for joint rotation with a vehicle steering wheel by a splined connection. In one conventional design, a threaded axial extension on the end of the steering shaft projects through an axial opening in a base plate of the steering wheel. A nut is screwed on the threaded extension on the steering shaft to prevent axial movement of the steering wheel relative to the steering shaft. An air bag module is then secured in the steering wheel and conceals the nut.

Another known design for preventing axial movement between the steering shaft and the steering wheel uses a radially extending setscrew that engages the steering shaft. The setscrew is supported in a radial bore that extends through a hub portion of the steering wheel. This design is particularly useful for securing a steering wheel in which the air bag module is pre-assembled into the steering wheel because the presence of the air bag module prevents access to a nut as would be used in the aforementioned conventional design. The radially extending setscrew is accessed from the side of the steering shaft in the radial direction. Several other known designs for preventing axial movement between the steering shaft and the steering wheel employ a fastener that is accessed from the radial direction.

SUMMARY OF THE INVENTION

The present invention is an apparatus comprising a vehicle steering wheel including a hub portion having a splined inner surface and diametrically opposed first and second angled surface portions. A vehicle steering shaft is rotatable about a first axis to effect vehicle steering. The steering shaft includes an end portion having an outer surface with splines that mesh with the splined inner surface of the hub portion to connect the steering shaft non-rotatably with the steering wheel for joint rotation about the first axis. The end portion of the steering shaft includes an inner surface defining a passage through the end portion that extends transverse to the first axis. A bolt has a head portion at a first end and a threaded outer surface adjacent a second end. The bolt includes a shank portion between the head portion and the threaded outer surface. The shank portion is disposed in the passage through the end portion of the steering shaft and engages the inner surface defining the passage. The head portion of the bolt has a first frustoconical surface. A nut having a threaded inner surface engages the threaded outer surface of the bolt. The nut includes a second frustoconical surface. The first frustoconical surface on the bolt and the second frustoconical surface on the nut engage the diametrically opposed first and second angled surface portions, respectively, on the hub portion of the steering wheel. These engagements create a compressive reaction load between the hub portion and the steering shaft and block relative movement between the steering wheel and the steering shaft along the first axis.

In accordance with another feature of the present invention, the end portion of the steering shaft includes an annular groove. The steering wheel includes a base plate through which the hub portion extends. A spring clip secures the steering wheel to the steering shaft in the absence of the bolt. The spring clip has a U-shaped end portion, which snaps around the base plate of the steering wheel, and a pair of resilient legs, which extend across the base plate. The legs of the spring clip are disposed in the annular groove in the steering shaft.

BRIEF DESCRIPTION OF THE DRAWINGS

The foregoing and other features of the present invention will become apparent to those skilled in the art to which the present invention relates upon reading the following description with reference to the accompanying drawings, in which.

DESCRIPTION OF PREFERRED EMBODIMENTS

Figure 1:
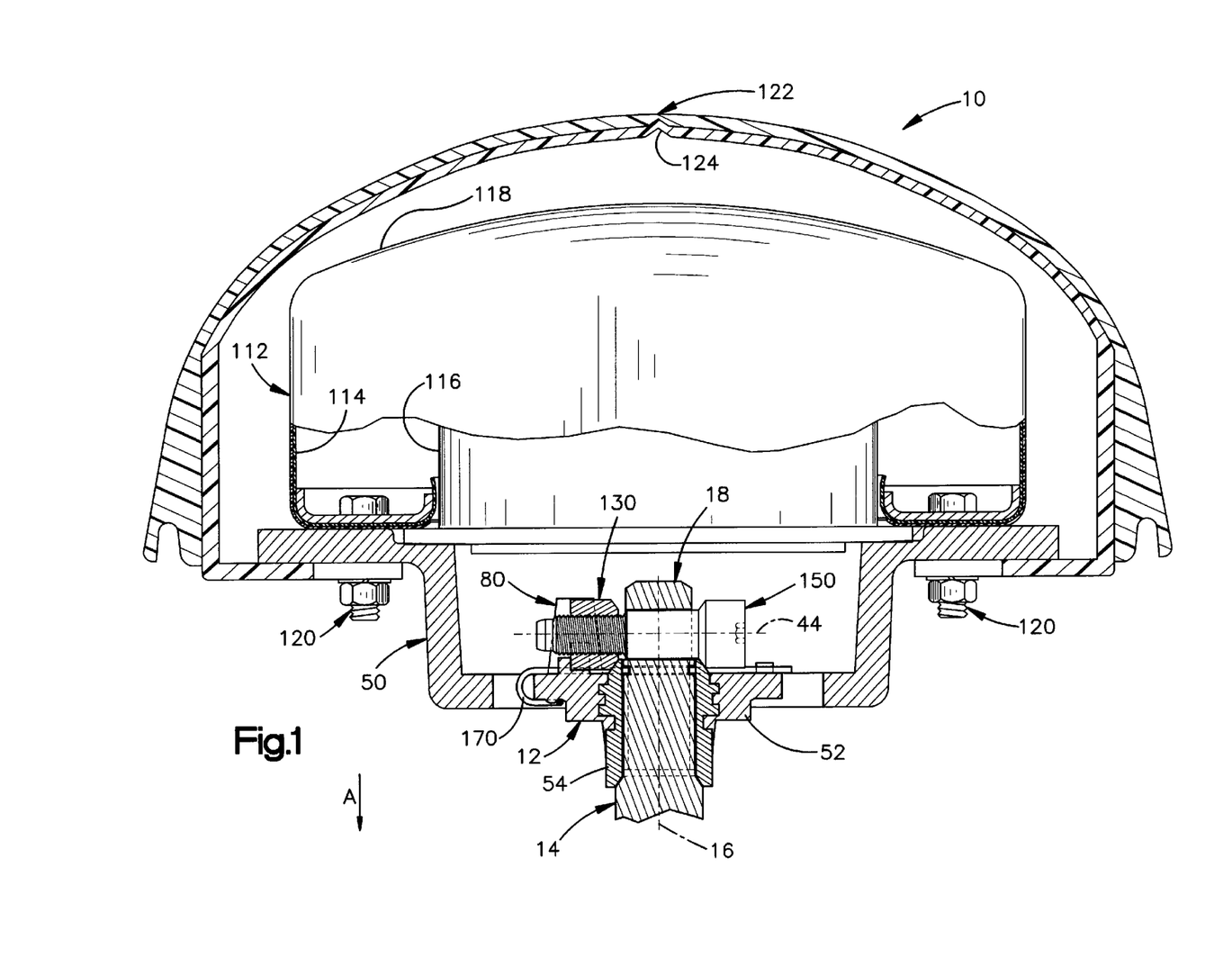
FIG. 1 is a side view, partly in section, of an apparatus constructed in accordance with a first embodiment of the present invention.

The present invention relates to an apparatus for attaching a vehicle steering wheel assembly to a vehicle steering shaft. As representative of the present invention, FIG. 1 illustrates an apparatus 10 comprising a vehicle steering wheel assembly 12 and a vehicle steering shaft 14.

The steering shaft 14 is operatively coupled, in a manner not shown, with steerable vehicle wheels (not shown). The steering shaft 14 is rotatable about a first axis 16 to cause the vehicle wheels to turn laterally of the vehicle and thereby effect vehicle steering. The steering shaft 14 has an end portion 18 to which the steering wheel assembly 12 attaches.

Figure 2:
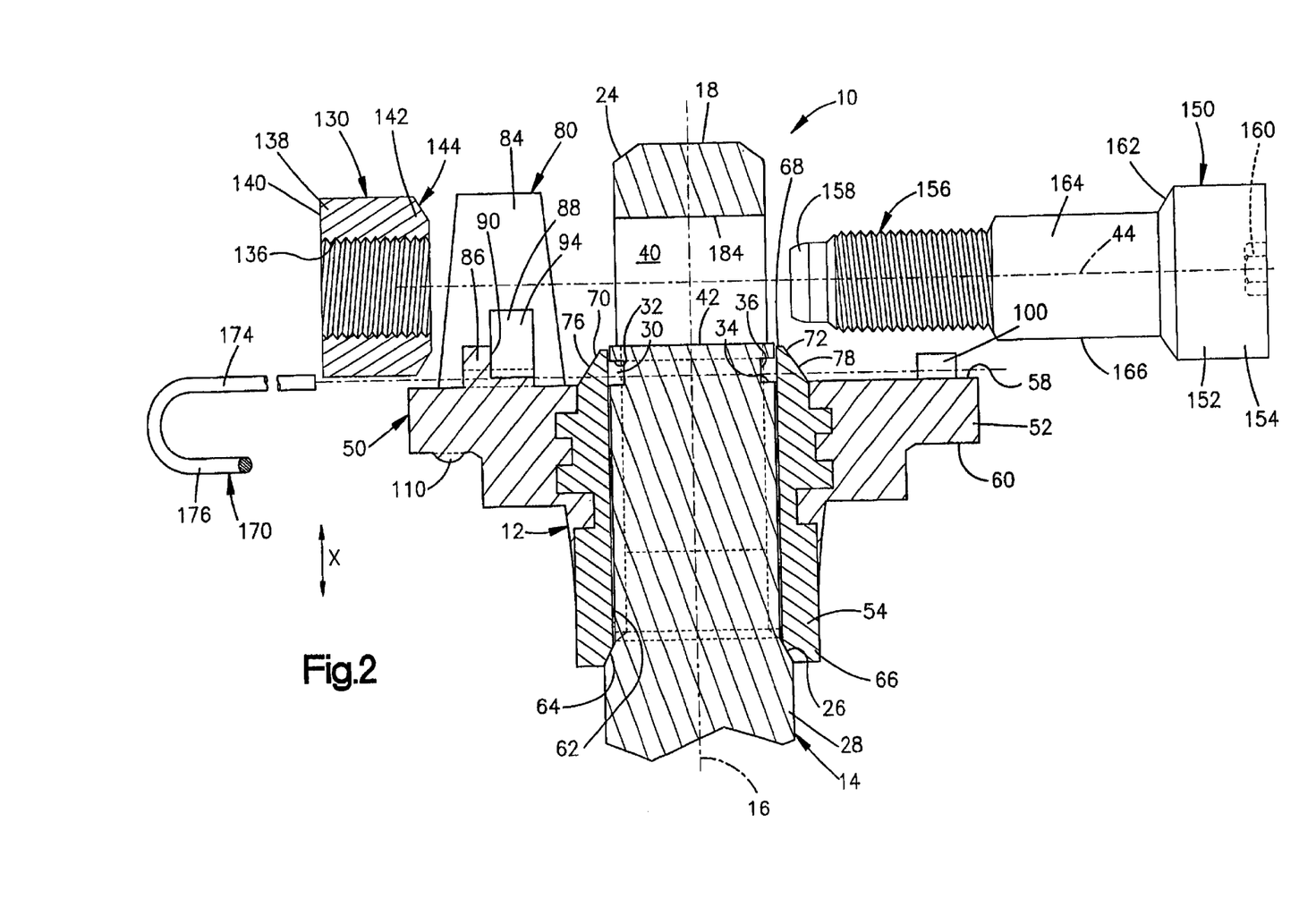
FIG. 2 is an enlarged sectional view of a portion of the apparatus of FIG. 1, with parts exploded for clarity.
Figures 3, 4:
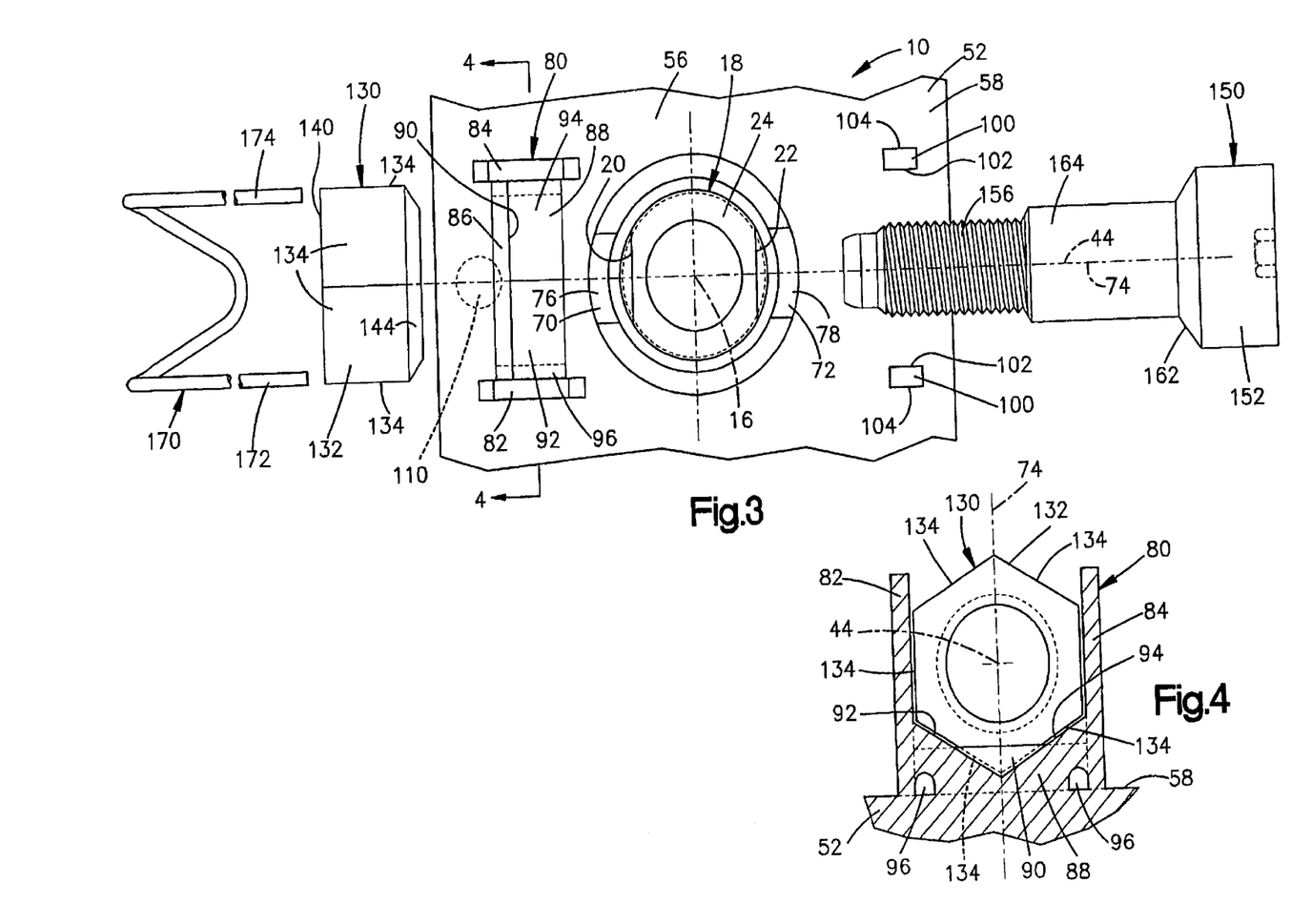
FIG. 3 is a plan view of FIG. 2.
FIG. 4 is a sectional view taken along line 4—4 in FIG. 3 with parts omitted for clarity.

The outer surface of the end portion 18 of the steering shaft 14 includes axially extending splines (not shown) and a pair of diametrically opposed flats 20 and 22 (FIG. 3). The splines and the flats extend from a chamfered surface 24 (FIG. 2) at the terminal end of the end portion 18 to a tapered section 26 of the end portion. The tapered section 26 extends at an angle of approximately 10° from the first axis 16 and connects with an adjacent section 28 of the steering shaft 14 that has a larger diameter than the end portion 18.

The end portion 18 of the steering shaft 14 further includes an annular groove 30 and a transversely extending passage 40. The annular groove 30 is located between the chamfered surface 24 and the tapered section 26. The annular groove 30 is defined by radially extending upper and lower surfaces 32 and 34 connected by an axially extending surface 36. The passage 40 through the end portion 18 is defined by a cylindrical inner surface 42. The passage 40 is located between the annular groove 30 and the chamfered surface 24. The passage 40 extends between the diametrically opposed flats 20 and 22 and is centered on a second axis 44 that is perpendicular to the first axis 16.

The steering wheel assembly 12 includes a die cast steering wheel armature 50 having an outer rim (not shown), a base plate 52, and a plurality of spokes (not shown) connecting the outer rim with the base plate. The steering wheel armature 50 may be made from magnesium or aluminum, and includes a steel hub 54 that is cast into a central portion 56 (FIG. 3) of the base plate 52. The base plate 52 has an upper surface 58 and a lower surface 60 (FIG. 2).

The hub 54 has a cylindrical inner surface 62 that defines a bore (not numbered) through the hub. The bore is centered on the first axis 16. The inner surface 62 includes axially extending splines (not shown) that are designed to mesh with the splines on the outer surface of the end portion 18 of the steering shaft 14 to connect the steering wheel assembly 12 non-rotatably with the steering shaft for joint rotation about the first axis 16. The inner surface 62 includes a tapered portion 64 at a lower end 66, as viewed in FIGS. 1, 2 and 5, of the hub 54. The tapered portion 64 on the inner surface 62 of the hub 54 is designed to have an interference fit with the tapered section 26 on the outer surface of the steering shaft 14.

Figure 5:
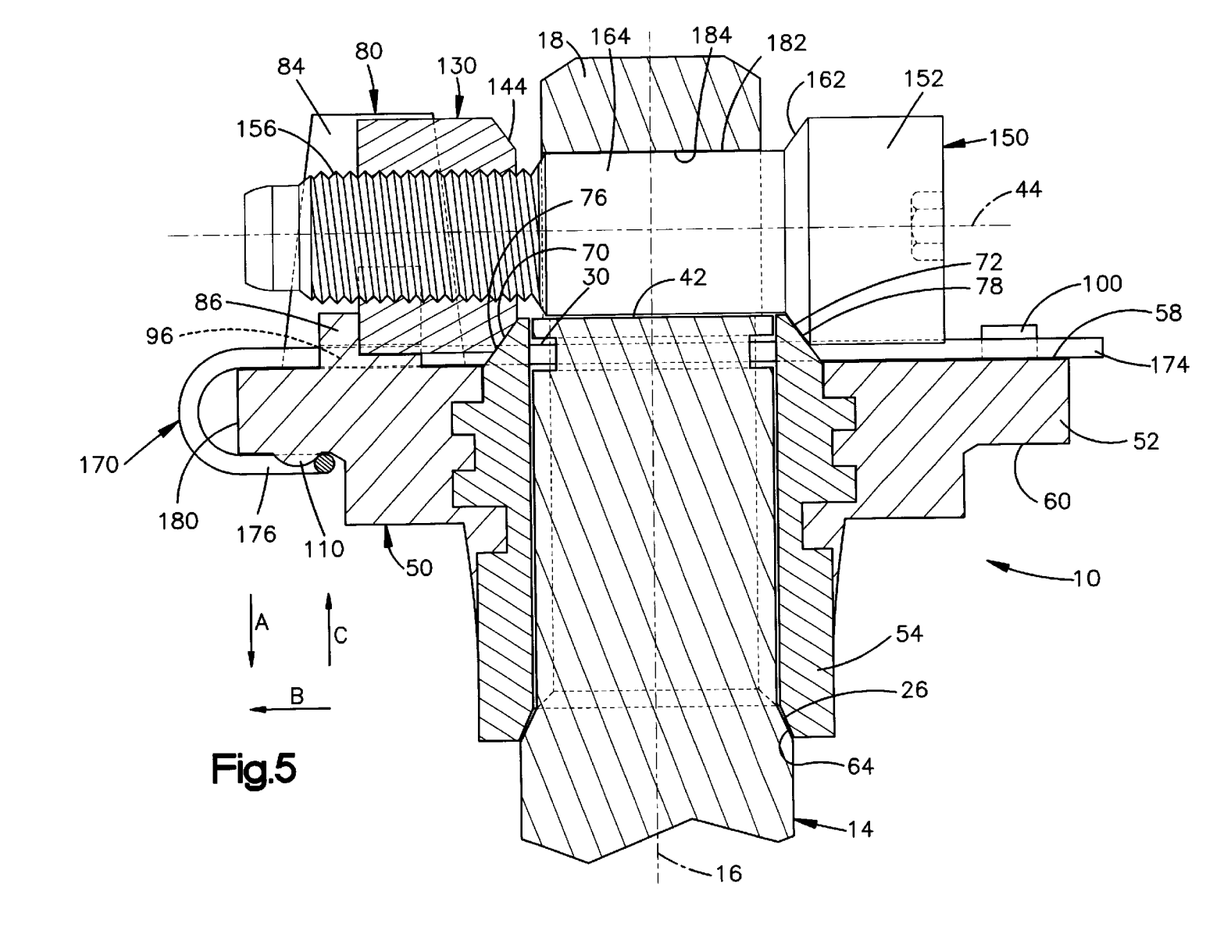
FIG. 5 is an enlarged sectional view similar to FIG. 2 illustrating an assembled condition.

An oppositely disposed upper end 68, as viewed in FIGS. 1, 2, and 5, of the hub 54 includes diametrically opposed first and second wedge portions 70 and 72. The first and second wedge portions 70 and 72 of the hub 54 project upward above the upper surface 58 of the base plate 52. Each of the first and second wedge portions 70 and 72 is symmetrical about a vertical plane 74 (FIG. 3) that passes through the axis 16. When the steering shaft 14 is inserted into the hub 54 and the wedge portions 70 and 72 are properly aligned with the passage 40 through the steering shaft, the vertical plane 74 will extend through the second axis 44.

The first wedge portion 70 has a first angled surface 76 (FIG. 2) that tapers radially inward and upward from the upper surface 58 of the base plate 52 toward the upper end 68 of the hub 54. Preferably, the first angled surface 76 has a frustoconical shape, but could alternatively have a planar shape. The first angled surface 76 extends at an angle of approximately 45° relative to the first axis 16. Similarly, the second wedge portion 72 has a second angled surface 78 that tapers radially inward and upward from the upper surface 58 of the base plate 52 toward the upper end 68 of the hub 54. The second angled surface 78 has a frustoconical shape, but could alternatively have a planar shape. The second angled surface 78 extends at an angle of approximately 45° relative to the first axis 16.

The base plate 52 of the steering wheel armature 50 further includes a nut cradle 80, a pair of detents 100, and a retaining tab 110. The nut cradle 80 and the detents 100 project upward from the upper surface 58 of the base plate 52 and are located on opposite sides of the hub 54. The nut cradle 80 is symmetrical about the vertical plane 74 and is aligned with the first wedge portion 70 on one side of the hub 54.

The nut cradle 80 is formed by opposed first and second side walls 82 and 84 (FIG. 3), an end wall 86, and a support wall 88. The end wall 86 extends between the side walls 82 and 84 and includes a stop surface 90. The support wall 88 also extends between the side walls 82 and 84 and projects from the end wall 86 toward the hub 54. The support wall 88 has a planar first surface 92 that extends from the first side wall 82 at an angle. A planar second surface 94 of the support wall 88 extends from the second side wall 84 at an angle. The second surface 94 of the support wall 88 intersects the first surface 92. The angle between the first and second surfaces 92 and 94 is approximately 120° to coincide with the hexagonal shape of a common nut.

A pair of tunnels 96 (FIG. 4) extend through the nut cradle 80 just above the upper surface 58 of the base plate 52. More specifically, the tunnels 96 extend through the end wall 86 and through the support wall 88 of the nut cradle 80. One of the tunnels is located adjacent the first side wall 82 of the nut cradle 80, while the other tunnel is located adjacent the second side wall 84.

The pair of detents 100 (FIG. 3) on the upper surface 58 of the base plate 52 are located on the opposite side of the hub 54 from the nut cradle 80. The detents 100 are spaced apart by approximately the same distance as the first and second side walls 82 and 84 of the nut cradle 80. Each of the detents 100 has a rectangular shape with an inwardly facing surface 102 and an outwardly facing surface 104.

The retaining tab 110 projects downward from the lower surface 60 of the base plate 52 underneath the nut cradle 80. The retaining tab has an arcuate shape, as may be seen in FIGS. 2 and 3.

The steering wheel assembly 12 includes an air bag module 112 (FIG. 1). The air bag module 112 includes an inflatable vehicle occupant protection device, or air bag, 114 and an actuatable inflator 116 for, when inflated, inflating the air bag. The air bag 114 is folded and positioned about the inflator 116 in a known manner (not shown). The air bag module 112 is secured to the steering wheel armature 50 by a plurality of fasteners 120.

The steering wheel assembly 12 further includes a cover 122 that encloses the air bag module 112 and is attached to the steering wheel armature 50. The cover 122 may be made from one or more layers of polymeric material and may be attached by the fasteners 120, or may be molded to the steering wheel armature 50. Portions (not shown) of the cover 122 may also cover the outer rim and the spokes of the steering wheel armature 50. The cover 122 includes a rupturable seam 124 that ruptures to allow the air bag 114, when inflated, to deploy through the cover.

The apparatus 10 further includes a nut 130, a bolt 150, and a spring clip 170. The nut 130 has a hexagonal outer surface 132 (FIG. 4) defined by six planar surfaces 134. The nut 130 has a cylindrical inner surface 136 (FIG. 2) centered on the second axis 44. The inner surface 136 is threaded. At a first end 138 of the nut 130, a radial surface 140 extends between the threaded inner surface 136 and the hexagonal outer surface 132. At an oppositely disposed second end 142 of the nut 130, a frustoconical surface 144 extends between the threaded inner surface 136 and the hexagonal outer surface 132. The frustoconical surface 144 on the nut 130 extends at an angle of approximately 45° relative to the second axis 44.

The bolt 150 is centered on the second axis 44. The bolt 150 has a head portion 152 at a first end 154 of the bolt, and a threaded portion 156 adjacent a second end 158 of the bolt. The outer surface of the threaded portion 156 is threaded to mate with the threaded inner surface 136 of the nut 130. The threaded portion 156 of the bolt 150 includes a deformable locking thread (not shown), as is known in the art, to prevent vibration from causing the bolt to loosen once the bolt has been tightened in the nut 130.

The head portion 152 of the bolt 150 includes a receptacle 160 for receiving a tool (not shown) for rotating the bolt to tighten the bolt. The head portion 152 of the bolt 150 further includes a frustoconical surface 162 that extends between the head portion and a shank portion 164 of the bolt. The frustoconical surface 162 on the bolt 150 extends at an angle of approximately 45° relative to the second axis 44. The shank portion 164 of the bolt extends between the head portion 152 and the threaded portion 156. The shank portion 164 has a cylindrical outer surface 166.

The spring clip 170 has a compound U-shape defined by parallel first and second legs 172 and 174 (FIG. 3) that are connected by a clip section 176. The legs 172 and 174 of the spring clip 170 are spaced apart by a distance that is slightly less than the diameter of the steering shaft 14 inside the annular groove 30. The clip section 176 has a U-shape in both the vertical direction, indicated by arrow X in FIG. 2, and the horizontal direction, indicated by arrow Y in FIG. 3. The spring clip 170 is preferably made from spring steel, also known as music wire, so that the spring clip has high tensile strength and high shear strength. The diameter of the spring steel used for the spring clip 170 is in the range of 1 to 4 millimeters.

Figure 6:
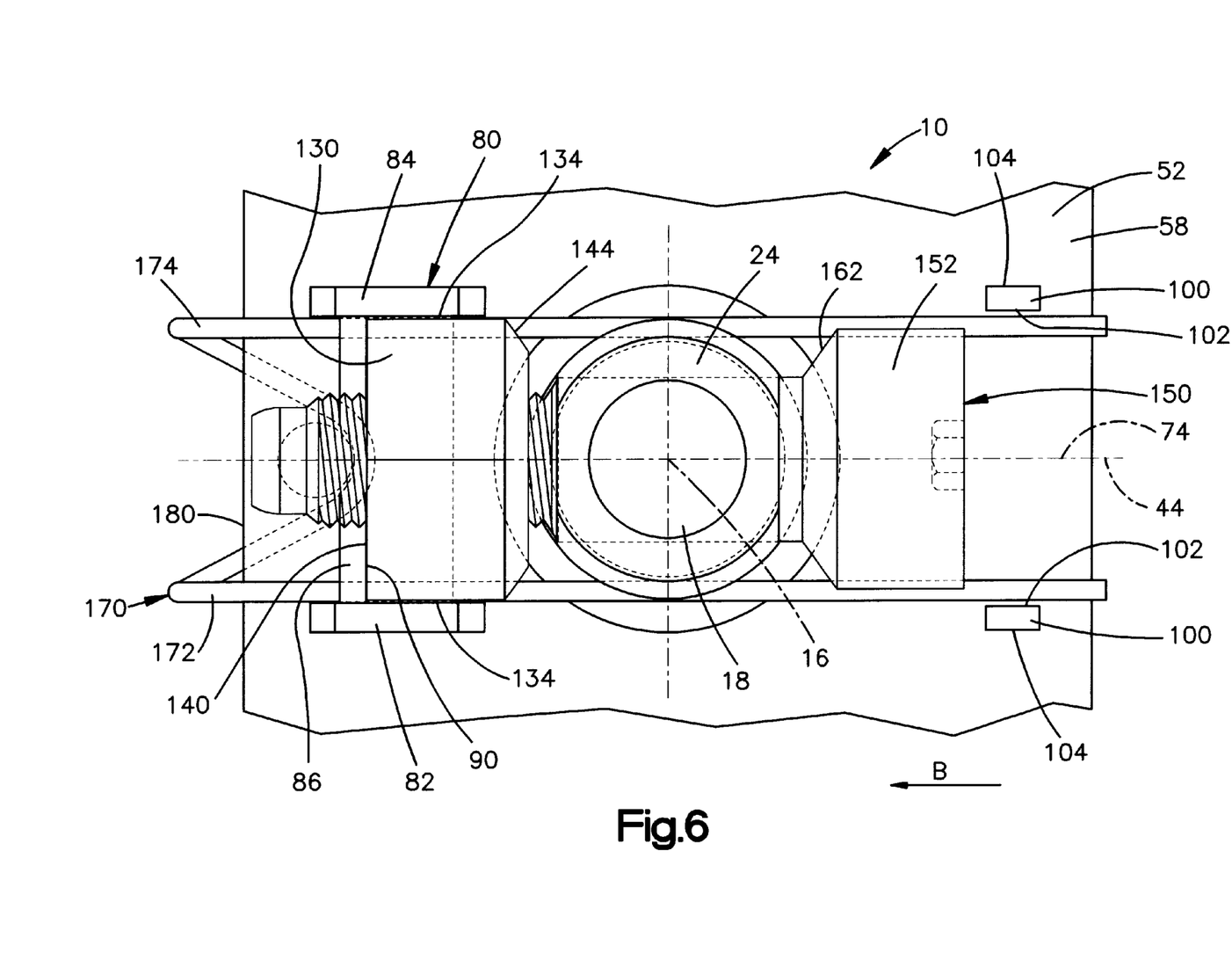
FIG. 6 is a plan view of FIG. 5.

To attach the steering wheel assembly 12 to the steering shaft 14, the spring clip 170 is first snapped into place on the base plate 52 of the steering wheel armature 50. Each of the first and second legs 172 and 174 of the spring clip 170 extends through a respective one of the tunnels 96 in the nut cradle 80 and across the upper surface 58 of the base plate 52. The nut cradle 80 restrains the legs 172 and 174 of the spring clip 170 from movement away from the upper surface 58 of the base plate 52. Further, each of the legs 172 and 174 is disposed in the annular groove 30 in the end portion 18 of the steering shaft 14, as best seen in FIGS. 5 and 6.

On the other side of the hub 54 from the nut cradle 80, the first and second legs 172 and 174 of the spring clip 170 lie between the detents 100 on the upper surface 58 of the base plate 52.

The clip section 176 of the spring clip 170 snaps around a side surface 180 of the base plate 52 and over the retaining tab 110 on the lower surface 160 of the base plate. The retaining tab 110 keeps the spring clip 170 from moving laterally, indicated by arrow B in FIG. 5, after the spring clip has been installed.

Once installed, the legs 172 and 174 of the spring clip 170 lie inside the groove 30 to hold the steering wheel assembly 12 on the steering shaft 14 in the absence of the bolt 150. Such an absence could occur prior to the installation of the bolt 150, after the removal of the bolt during a disassembly process, or in the event of failure of the bolt. The spring clip 170 is designed to hold the steering wheel assembly 12 on the steering shaft 14 and withstand an upwardly directed force, indicated by arrow C in FIG. 5, on the steering wheel assembly of up to 500 lbs.

Next, the nut 130 is placed into the nut cradle 80 on the upper surface 58 of the base plate 52 of the steering wheel armature 50. As shown in FIG. 6, an oppositely disposed first pair of the six planar surfaces 134 defining the hexagonal outer surface 132 of the nut 130 engage the first and second side walls 82 and 84, respectively, of the nut cradle 80. An adjoining second pair of the six planar surfaces 134 engage the first and second surfaces 92 and 94, respectively, of the support wall 88 that extends underneath a portion of the nut 80. As best seen in FIG. 5, a portion of the radial surface 140 at the first end 138 of the nut 130 engages the stop surface 90 of the end wall 86. Further, the frustoconical surface 144 at the second end 142 of the nut 130 engages the first angled surface 76 of the firs t wedge portion 70 of the hub 54. Because both the frustoconical surface 144 and the first angled surface 76 have an arcuate shape, these two surfaces engage via line contact.

Next, the hub 54 in the base plate 52 of the steering wheel armature 50 is placed over the steering shaft. The angular orientation of the hub 54 relative to the steering shaft 14 is such that the vertical plane 74 denoting the center of the wedge portions 70 and 72 extends through the transversely extending second axis 44 upon which the passage 40 through the steering shaft is centered. The steering wheel assembly 12 is then moved downward, in the direction of arrow A in FIGS. 1 and 5, and into engagement with the end portion 18 of the steering shaft 14. The end portion 18 of the steering shaft 14 is received in the bore through the hub 54. The splines on the outer surface of the end portion 18 of the steering shaft 14 mesh with the splines in the bore through the hub 54 to connect the steering wheel assembly 12 non-rotatably with the steering shaft 14 for joint rotation about the first axis 16.

The steering wheel assembly 12 is moved in the downward direction A until the tapered portion 64 of the hub 54 engages the tapered section 26 of the steering shaft 14. The engagement of the tapered portion 64 of the hub 54 with the tapered section 26 of the steering shaft 14 is an interference fit, but is non-locking. When the tapered portion 64 of the hub 54 is engaged with the tapered section 26 of the steering shaft 14, at least a portion of the annular groove 30 in the end portion 18 of the steering shaft 14 is located above the upper surface 58 of the base plate 52.

The bolt 150 is then inserted in the direction of arrow B into the passage 40 in the end portion 18 of the steering shaft 14 and into threaded engagement with the nut 130. The threaded portion 156 of the bolt 150 is screwed into the nut 130 by rotating the bolt about the second axis 44 using a tool (not shown) that is inserted into the apparatus 10 in the direction indicated by arrow B. The side walls 82 and 84 and the support wall surfaces 92 and 94 that are engaged by the outer surface 132 of the nut 130 prevent the nut from rotating as the bolt 150 is being screwed into the nut. The engagement of the radial surface 140 on the nut 130 with the stop surface 90 prevents the nut from moving axially along the second axis as the bolt 150 is screwed into the nut.

The bolt is screwed into the nut until the frustoconical surface 162 on the head portion 152 of the bolt engages the second angled surface 78 on the second wedge portion 72 of the hub 54. Because both the frustoconical surface 162 and the second angled surface 78 have an arcuate shape, these two surfaces engage via line contact.

Once the frustoconical surface 162 on the head portion 152 of the bolt 150 engages the second angled surface 78 on the second wedge portion 72 of the hub 54, continued rotation of the bolt in a clockwise, or tightening, direction causes the steering wheel assembly 12 to be forced downward, in the direction of arrow A, and farther onto the end portion 18 of the steering shaft 14. The downward movement of the steering wheel assembly 12 is caused by the frustoconical surfaces 144 and 162 on the nut 130 and the bolt 150, respectively, bearing against the first and second angled surfaces 76 and 78, respectively, on the hub 54. Further, an upper surface portion 182 (FIG. 5) of the shank portion 164 of the bolt 150 is caused to bear against an upper surface portion 184 defining the passage 40 through the steering shaft 14. As the steering wheel assembly 12 moves further downward onto the steering shaft 14, the legs 172 and 174 of the spring clip 170 are moved toward the bottom of the annular groove 30 in the end portion 18 of the steering shaft. The spring clip 170 then no longer provides the primary axial retention feature for the steering wheel assembly. This reduces the shear stress on the spring clip and helps to protect against fatigue of the spring clip.

The engagement of the frustoconical surfaces 144 and 162 on the nut 130 and the bolt 150, respectively, with the angled surfaces 76 and 78, respectively, on the hub 54, as well as the engagement of the upper surface portion 182 of the bolt 150 with the upper surface portion 184 defining the passage 40, creates a compressive reaction load between the hub 54 and the steering shaft 14. This compressive reaction load blocks relative movement between the steering wheel assembly 12 and the steering shaft 14 along the first axis 16. It will be appreciated by those skilled in the art that the distance between the angled surface portions 76 and 78 on the hub 54 should be kept as small as possible so that, as the compressive reaction load is created, excessive bending of the bolt 150 does not occur.

Removal of the steering wheel assembly 12 from the steering shaft 14 involves a reversal of the steps described above for attaching the steering wheel assembly, and thus need not be described in detail. However, it should be noted that when removing the steering wheel assembly 12 from the steering shaft 14, the legs 172 and 174 of the spring 170 should first be moved away from each other in the lateral direction Y and placed into engagement with the outwardly facing surfaces 104 of the detents 100. This step will help to disengage the legs 172 and 174 from the groove 30 in the steering shafts 14 so that the steering wheel assembly 12 can be more easily pulled off of the shaft when the bolt 150 is removed.

Figure 7:
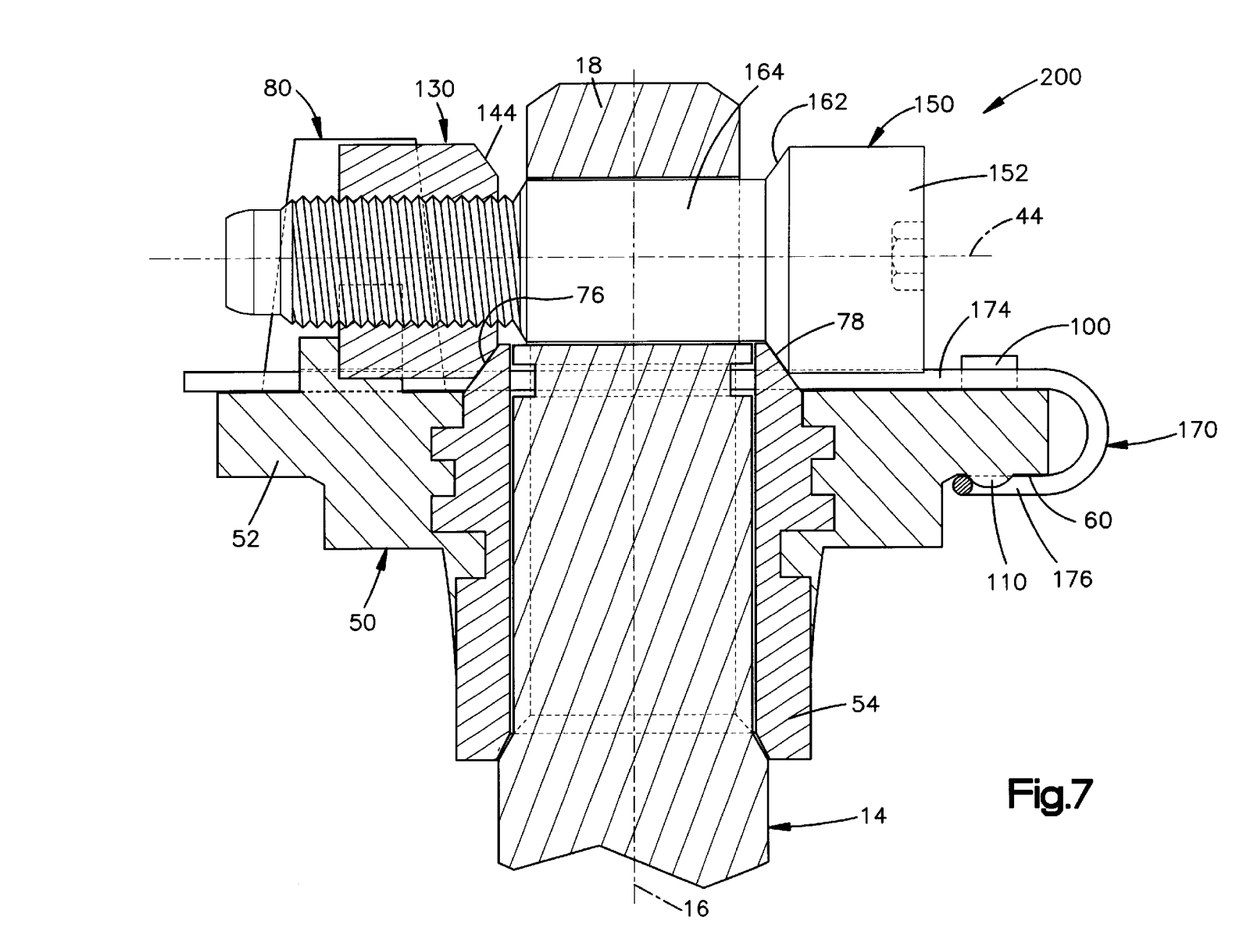
FIG. 7 is an enlarged sectional view similar to FIG. 5 illustrating a second embodiment of the present invention.

FIG. 7 illustrates an apparatus 200 constructed in accordance with a second embodiment of the present invention. In the second embodiment of FIG. 7, reference numbers identical to those of the first embodiment of FIGS. 1–6 are used to designate parts that are similar to parts in the first embodiment.

According to the second embodiment, the spring clip 170 is oriented 180° from the orientation shown in the first embodiment. The U-shaped clip section 176 of the spring clip 170 is on the same side of the hub 54 as the head portion 152 of the bolt 150. The only other difference between the first and second embodiments is the location of the retaining tab 110 on the lower surface 60 of the base plate 52. The retaining tab 110 is also located 180° from its location in the first embodiment so that the retaining tab is positioned to engage and secure the clip section 176 of the spring clip 170. The apparatus 200 functions in an identical manner to the apparatus 10 of the first embodiment to create a compressive reaction load between the hub 54 and the steering shaft 14. The apparatus 200 thereby blocks relative movement between the steering wheel assembly 12 and the steering shaft along the first axis 16.

Figure 8:
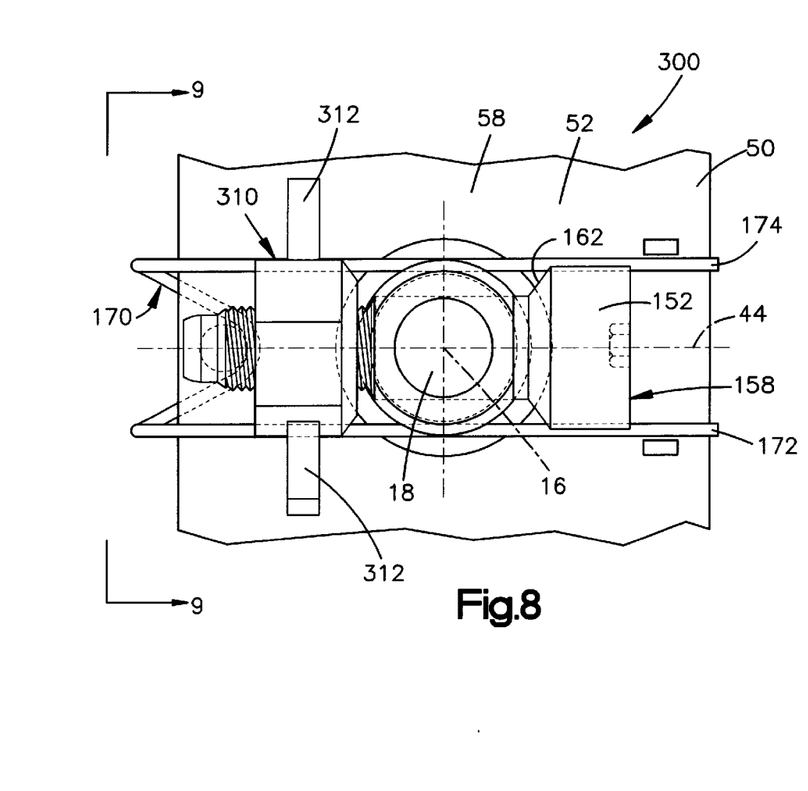
FIG. 8 is a plan view similar to FIG. 6 illustrating a third embodiment of the present invention.
Figure 9:
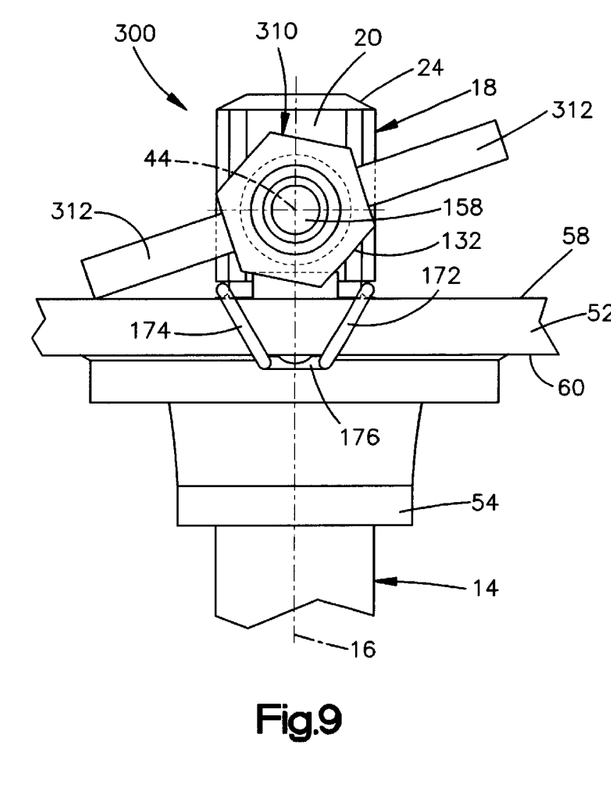
FIG. 9 is an end view of the apparatus shown in FIG. 8.

FIGS. 8 and 9 illustrate an apparatus 300 constructed in accordance with a third embodiment of the present invention. In the third embodiment of FIGS. 8 and 9, reference numbers identical to those of the first embodiment of FIGS. 1–6 are used to designate parts that are similar to parts in the first embodiment.

According to the third embodiment, the base plate 52 of the steering wheel armature 50 does not include a nut cradle 80 for preventing axial and rotational movement of a nut when the bolt 150 is being screwed into the nut. Instead, the apparatus 300 includes a nut 310 that has a diametrically opposed pair of flanges 312. The flanges 312 project radially outward from the hexagonal outer surface 132 of the nut 310. When the bolt 150 is being screwed into the nut 310, the nut rotates slightly with the bolt until one of the flanges 312 engages the upper surface 58 of the base plate 52, as shown in FIG. 9, thereby to prevent further rotation of the nut. When the bolt 150 is being unscrewed from the nut 310, the nut rotates with the bolt in the opposite direction until the other flange 312 engages the upper surface 58 of the base plate 52 thereby to prevent further rotation of the nut.

The apparatus 300 functions in an identical manner to the apparatus 10 of the first embodiment to create a compressive reaction load between the hub 54 and the steering shaft 14 and thereby block relative movement between the steering wheel assembly 12 and the steering shaft 14 along the first axis 16.

Figure 10:
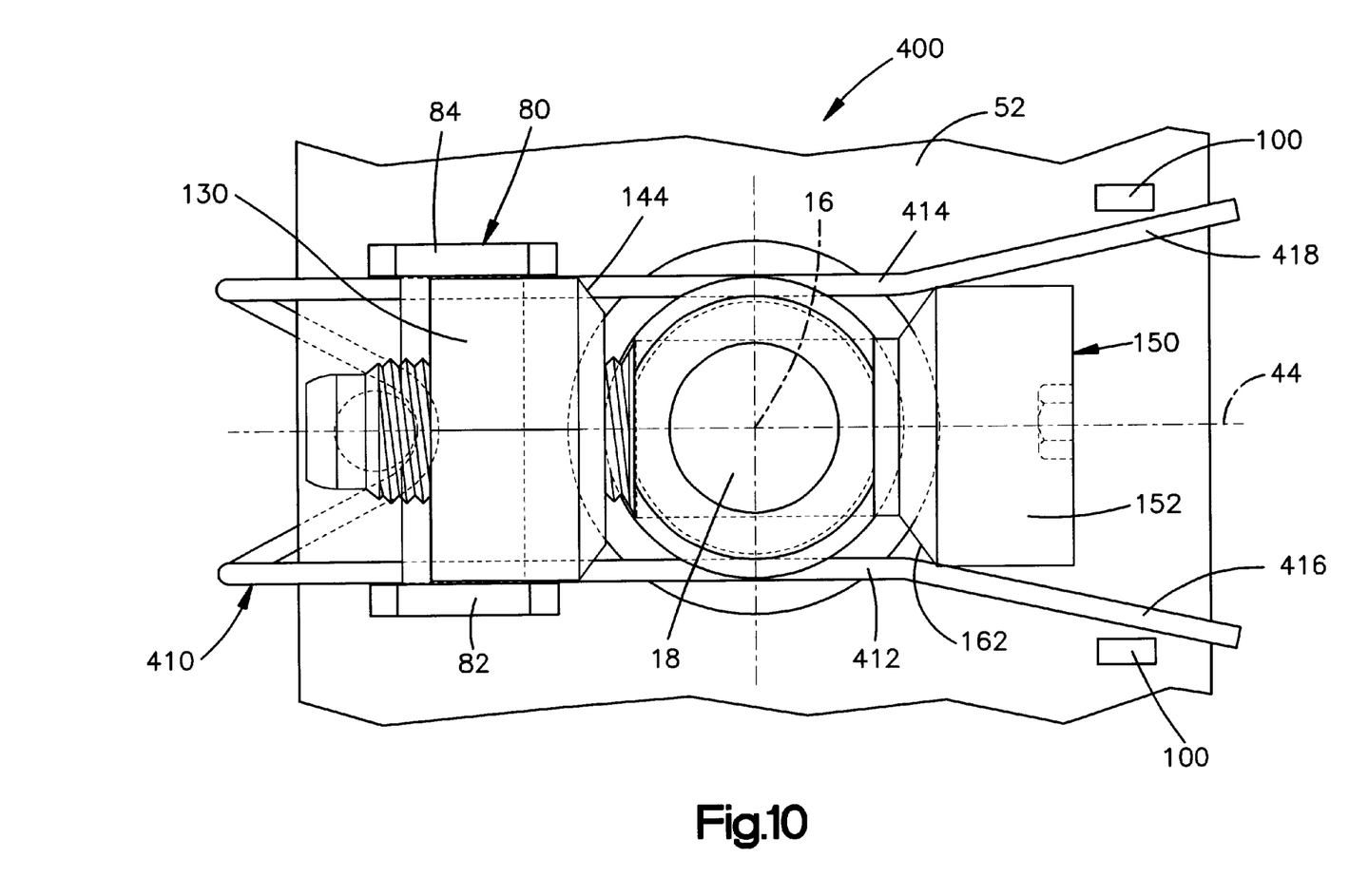
FIG. 10 is a plan view similar to FIG. 6 illustrating a fourth embodiment of the present invention.

FIG. 10 illustrates an apparatus 400 constructed in accordance with a fourth embodiment of the present invention. In the fourth embodiment of FIG. 10, reference numbers identical to those of the first embodiment of FIGS. 1–6 are used to designate parts that are similar to parts in the first embodiment.

According to the fourth embodiment, the detents 100 on the upper surface 58 of the base plate 52 are spaced farther apart to accommodate a slightly different spring clip 410. The spring clip 410 has first and second legs 412 and 414 that have divergent end portions 416 and 418, respectively. The diverging end portions 416 and 418 of the legs 412 and 414, respectively, reduce the stress in the legs and make it easier to install and remove the spring clip 410. Otherwise, the apparatus 400 functions in an identical manner to the apparatus 10 of the first embodiment to create a compressive reaction load between the hub 54 and the steering shaft 14. The apparatus 400 thereby blocks relative movement between the steering wheel assembly 12 and the steering shaft along the first axis 16.

From the above description of the invention, those skilled in the art will perceive improvements, changes and modifications. Such improvements, changes and modifications within the skill of the art are intended to be covered by the appended claims.

Having described the invention, I claim:

1. An apparatus comprising:

a vehicle steering wheel including a hub portion having a splined inner surface and diametrically opposed first and second angled surface portions;

a vehicle steering shaft rotatable about a first axis to effect vehicle steering, said steering shaft including an end portion having an outer surface with splines that mesh with said splined inner surface of said hub portion to connect said steering shaft non-rotatably with said steering wheel for joint rotation about said first axis, said end portion of said steering shaft including an inner surface defining a passage through said end portion that extends transverse to said first axis;

a bolt having a head portion at a first end and a threaded outer surface adjacent a second end, said bolt including a shank portion between said head portion and said threaded outer surface, said shank portion being disposed in said passage through said end portion of said steering shaft and engaging said inner surface defining said passage, said head portion of said bolt having a first frustoconical surface; and a nut having a threaded inner surface engaging said threaded outer surface of said bolt, said nut including a second frustoconical surface, said first frustoconical surface on said bolt and said second frustoconical surface on said nut engaging said diametrically opposed first and second angled surface portions, respectively, on said hub portion of said steering wheel to create a compressive reaction load between said hub portion and said steering shaft and block relative movement between said steering wheel and said steering shaft along said first axis.

2. An apparatus as defined in claim 1 wherein said first and second angled surface portions extend at an angle of approximately 45° relative to said first axis.

3. An apparatus as defined in claim 2 wherein said passage through said end portion of said steering shaft is centered on a second axis which extends perpendicular to said first axis, said first frustoconical surface on said head portion of said bolt extending at an angle of approximately 45° relative to said second axis.

4. An apparatus as defined in claim 3 wherein said second frustoconical surface on said nut extends at an angle of approximately 45° relative to said second axis.

5. An apparatus as defined in claim 1 wherein said steering wheel includes a base plate having an upper surface, said hub portion being located in said base plate.

6. An apparatus as defined in claim 5 wherein said nut includes an outer surface and a diametrically opposed pair of flanges which project radially outward from said outer surface, one of said flanges engaging said upper surface of said base plate of said steering wheel when said bolt is tightened.

7. An apparatus as defined in claim 5 wherein said base plate of said steering wheel includes a cradle projecting from said upper surface of said base plate, said nut being disposed in said cradle, said cradle restraining said nut from rotational movement in response to rotational movement of said bolt.

8. An apparatus as defined in claim 5 wherein said end portion of said steering shaft includes an annular groove located above said upper surface of said base plate.

9. An apparatus as defined in claim 8 further comprising a spring clip for securing said steering wheel to said steering shaft in the absence of said bolt, said spring clip having a U-shaped end portion which snaps around said base plate of said steering wheel and a pair of resilient legs which extend across said upper surface of said base plate, said legs being disposed in said annular groove in said steering shaft.

10. An apparatus comprising:
a vehicle steering wheel armature having a base plate, said base plate including a hub portion having a splined inner surface;
a vehicle steering shaft rotatable about a first axis to effect vehicle steering, said steering shaft including an end portion having an outer surface with splines which mesh with said splined inner surface of said hub portion to connect said steering shaft non-rotatably with said steering wheel armature for joint rotation about said first axis,
said end portion of said steering shaft including an annular groove and a passage which extends transverse to said first axis;
a fastener disposed in said passage in said end portion of said steering shaft to secure said steering wheel armature to said steering shaft; and
a spring clip for securing said steering wheel armature to said steering shaft in the absence of said fastener, said spring clip having a U-shaped end portion which snaps around said base plate of said steering wheel armature and a pair of resilient legs which extend across said base plate, said legs being disposed in said annular groove in said steering shaft.

11. An apparatus as defined in claim 10 wherein said base plate of said steering wheel armature has an upper surface and a lower surface, said legs of said spring clip extending across said upper surface of said base plate.

12. An apparatus as defined in claim 11 wherein said base plate includes a tab projecting from said lower surface, said tab engaging said U-shaped end portion of said spring clip to secure said spring clip on said base plate.

13. An apparatus as defined in claim 11 wherein said fastener comprises a bolt having a head portion at a first end and a threaded outer surface adjacent a second end, said bolt including a shank portion between said head portion and said threaded outer surface, said shank portion being disposed in said passage through said end portion of said steering shaft and engaging said passage, said head portion of said bolt having a first frustoconical surface.

14. An apparatus as defined in claim 13 further comprising a nut having a threaded inner surface engaging said threaded outer surface of said bolt, said nut including a second frustoconical surface.

15. An apparatus as defined in claim 14 wherein said hub portion of said steering wheel armature includes diametrically opposed first and second angled surface portions, said first frustoconical surface on said bolt and said second frustoconical surface on said nut engaging said first and second angled surface portions, respectively, on said hub portion of said steering wheel to create a compressive reaction load between said hub portion and said steering shaft and block relative movement between said steering wheel armature and said steering shaft along said first axis.

16. An apparatus as defined in claim 15 wherein said base plate of said steering wheel includes a cradle projecting from said upper surface of said base plate, said nut being disposed in said cradle, said cradle restraining said nut from rotational movement in response to rotational movement of said bolt.

17. An apparatus as defined in claim 16 wherein said cradle includes means for restraining axial movement of said nut away from said bolt.

18. An apparatus as defined in claim 16 wherein said legs of said spring clip extend through openings in said cradle and are restrained from movement away from said upper surface of said base plate by said cradle.

* * * * *